(12) United States Patent
Hou et al.

(10) Patent No.: US 8,432,359 B2
(45) Date of Patent: *Apr. 30, 2013

(54) ERGONOMIC MOUSE

(75) Inventors: Chuan-Kung Hou, Yonghe (TW); Cheng-Hua Hsu, Taipei (TW)

(73) Assignee: Guan Technologies, LLC, Wilmington, DE (US)

( * ) Notice: Subject to any disclaimer, the term of this patent is extended or adjusted under 35 U.S.C. 154(b) by 1085 days.

This patent is subject to a terminal disclaimer.

(21) Appl. No.: 11/970,409

(22) Filed: Jan. 7, 2008

(65) Prior Publication Data

US 2008/0174557 A1    Jul. 24, 2008

Related U.S. Application Data

(63) Continuation of application No. 11/047,644, filed on Feb. 2, 2005, now Pat. No. 7,333,091.

(51) Int. Cl.
  *G06F 3/033*    (2006.01)
  *G09G 5/08*    (2006.01)

(52) U.S. Cl.
  USPC ........................................... 345/163

(58) Field of Classification Search .......... 345/163–166; 341/21, 34–35
  See application file for complete search history.

(56) References Cited

U.S. PATENT DOCUMENTS

| 5,870,081 A | 2/1999 | Wu |
| 7,233,318 B1 | 6/2007 | Farag et al. |

*Primary Examiner* — Michael Pervan

(57) ABSTRACT

An ergonomic mouse has a sliding cap matching the curvature of a normal human palm. The sliding cap may be slid on the top of a hollow body to reach a desired operation position, then fine-tuned and anchored. Thus when the mouse is moved during operation, it can absorb reaction forces to avoid hurting the user's wrist and better meet ergonomic requirements.

21 Claims, 7 Drawing Sheets

ERGONOMIC MOUSE

CROSS-REFERENCE TO RELATED APPLICATIONS

This application is a continuation application of U.S. patent application Ser. No. 11/047,644, filed on Feb. 2, 2005, now U.S. Pat. No. 7,333,091, issued Feb. 19, 2008, and which is incorporated herein by reference in its entirety.

FIELD OF THE INVENTION

The invention relates to an ergonomic mouse, and particularly to a mouse having a sliding cap pivotally mounted onto a hollow body and slidable thereon that may be fine-tuned and anchored to better meet ergonomic requirements.

BACKGROUND OF THE INVENTION

The typical mouse device has a track ball partially exposed on the outside. When the track ball rotates under a force, two wheels that are normal to each other located inside the mouse also rotate. Through optical detection, the rotation speeds of the two wheels are converted to moving distances on a set of coordinates. Hence when an electronic device is connected to the mouse, the cursor on the screen will move relatively from a start position to a destination position.

In order to suit the operation type and computer usage habit of different users, the mouse design is constantly being improved. Nowadays a wide variety of mouse selections are available on the market. Each has its unique functions and features.

Operation of the mouse mainly relies on the user's wrist. Moving the mouse for a prolonged period of time often results in physical pain to users, or even causes injury to the user's wrist. Although most mouse devices adopt an ergonomic design to prevent injury, they generally focus on the ergonomics of the palm for holding the mouse (namely to conform to the normal palm curvature), but rarely consider the ergonomics related to the moving of the mouse. As a result, many reaction forces are not absorbed. Injury to the wrist can still occur.

SUMMARY OF THE INVENTION

In view of the aforesaid problems, the primary object of the invention is to provide an ergonomic mouse. The mouse according to the invention has a sliding cap conforming to the common palm curvature of a human hand. The sliding cap is pivotally coupled to a hollow body and slidable on the top of the hollow body. The sliding cap may be moved to a desired operation position suitable to a user, and be fine-tuned and anchored on the hollow body. Then the mouse can absorb reaction forces while moving to avoid hurting the user's wrist. Thus it can better meet ergonomic requirements.

In order to achieve the foregoing object, the mouse according to the invention includes a hollow body and a sliding cap. The hollow body has a first port and a trough on the top, and a housing section in the interior. The sliding cap has a cap body, an axle and an elastic anchor member. The cap body has a boss running through the first port to pivotally couple the cap body on the top of the hollow body. The axle has two ends located respectively in the cap body and the housing section so that the cap body is turnable about the axle. The elastic anchor member corresponds to the trough to anchor the cap body relative to the hollow body. Hence after the cap body is slid to a desired operation position, it may be fine-tuned and anchored on the hollow body. When the mouse is moved during operation, it can absorb the reaction force to protect the user's wrist from injury. Thus it can better meet ergonomic requirements.

To make the sliding direction of the sliding cap more accurate, the invention further includes stub shafts pivotally located on the top of the hollow body and two opposite sides of the sliding cap to enable the sliding cap to slide forwards and backwards relative to the hollow body, or slide to the leftwards and rightwards, or slide forwards, backwards, leftwards and rightwards.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
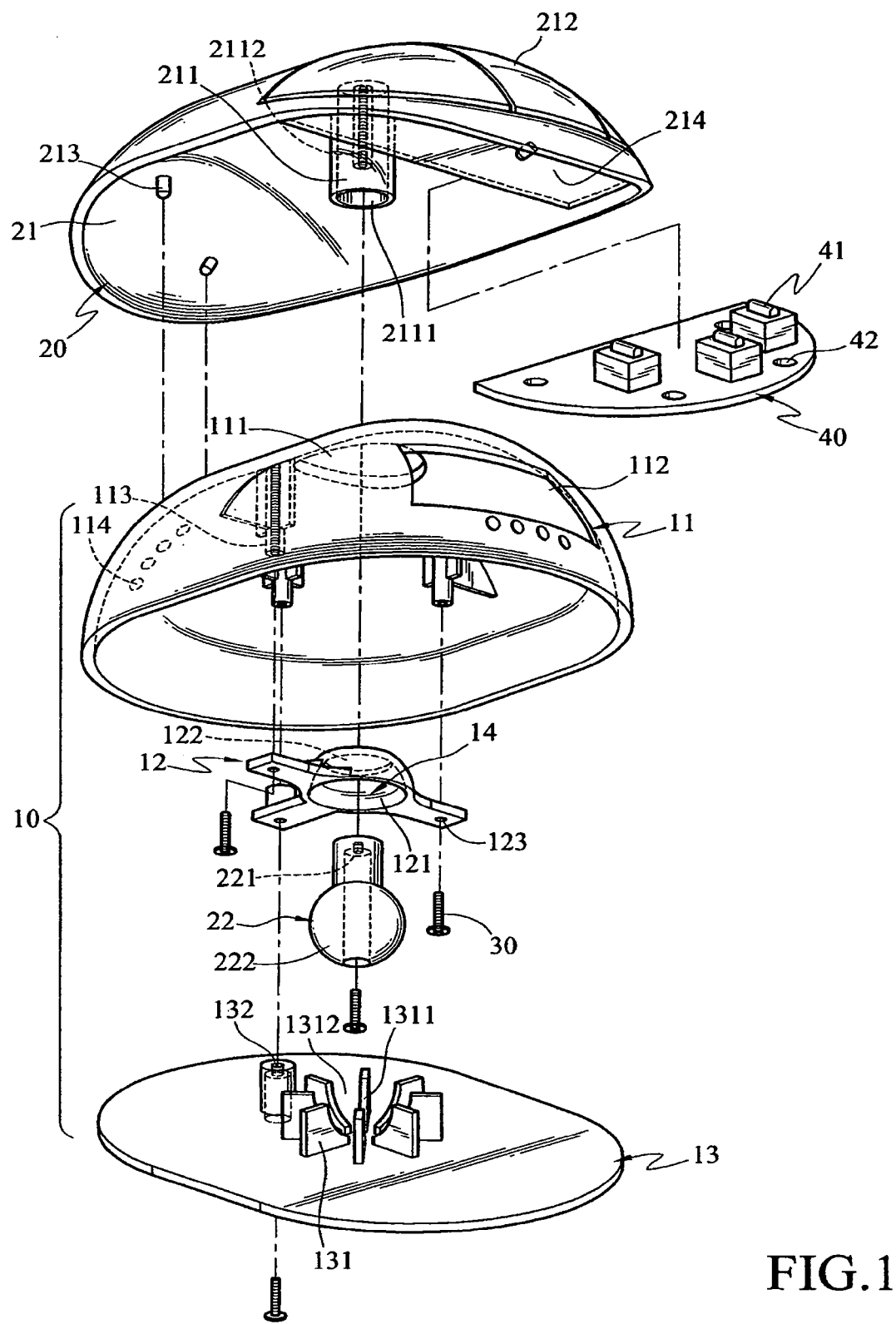
FIG. 1 is an exploded view of the invention.
Figure 2:
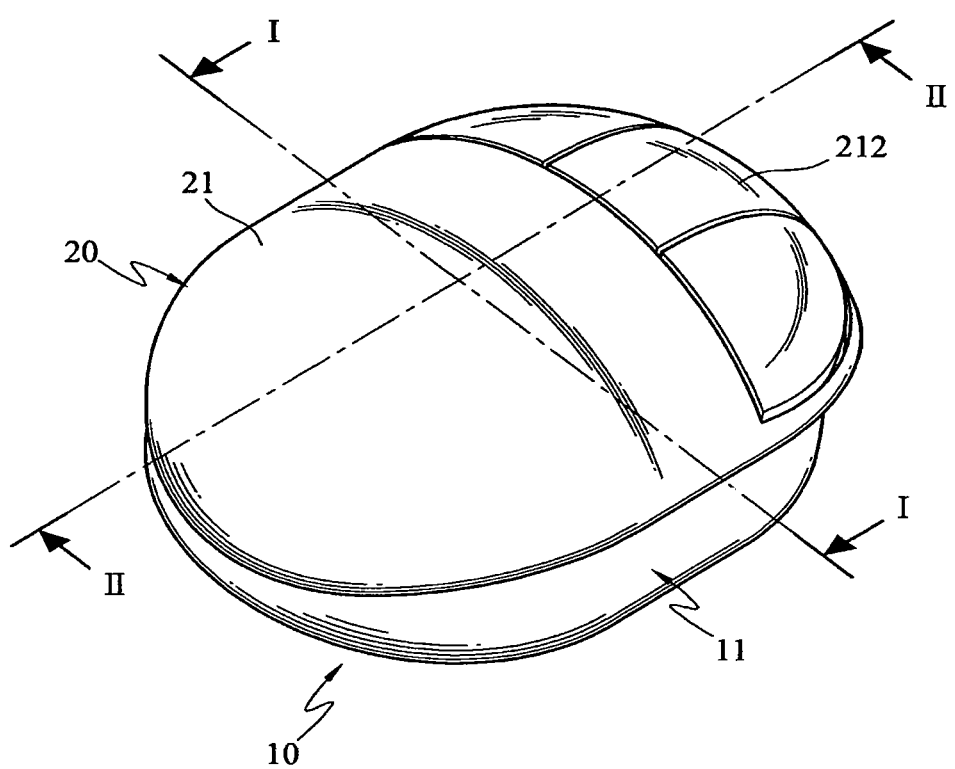
FIG. 2 is a perspective view of the invention.
Figure 3A:
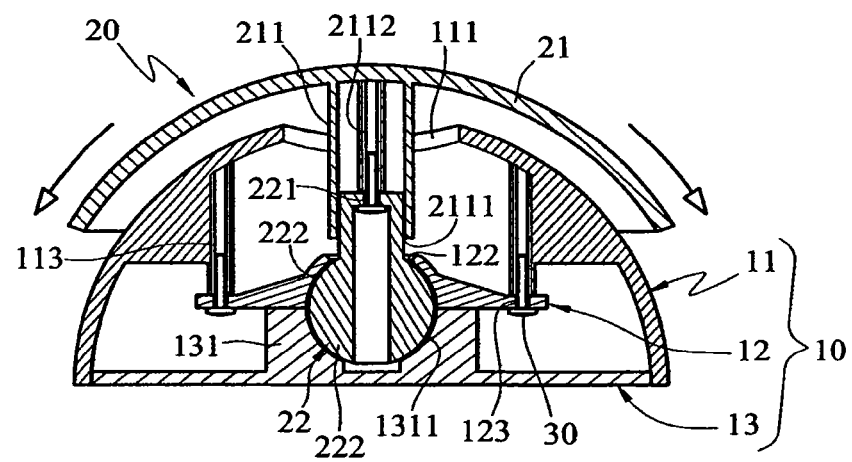
FIG. 3A is a cross-section taken on line I-I in FIG. 2.
Figure 3B:
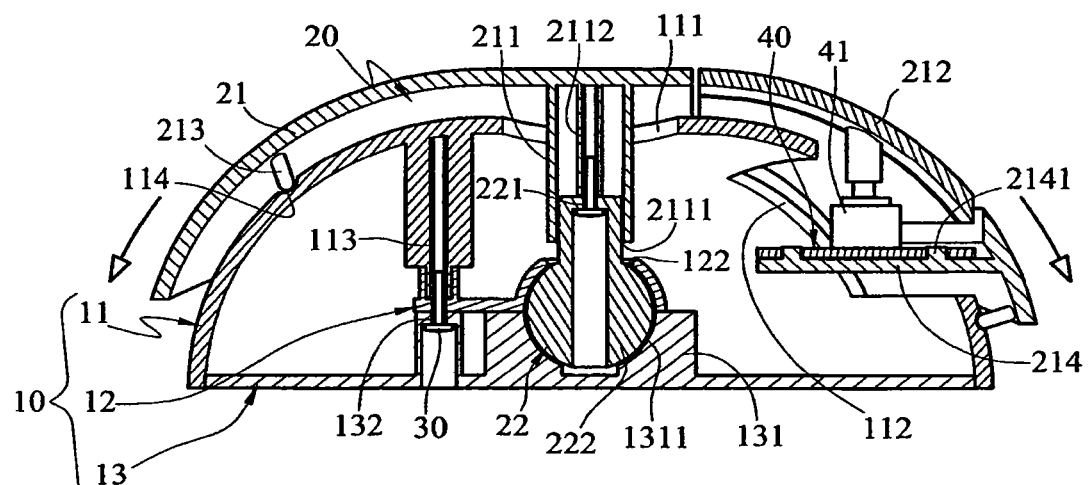
FIG. 3B is a cross-section taken on line II-II in FIG. 2.

Refer to FIG. 1 for an exploded view of the invention, FIG. 2 for a perspective view of the invention, FIG. 3A for a cross-section taken on line I-I in FIG. 2, and FIG. 3B for a cross-section taken on line II-II in FIG. 2. The ergonomic mouse according to the invention includes a hollow body 10 and a sliding cap 20 that is slidable on the top of the hollow body 10 and can be anchored when reaching a desired operation position. Thus the sliding cap 20 may be fine-tuned and anchored on the hollow body 10, so that when the mouse is moved during operation the reaction force may be absorbed to avoid hurting the user's wrist and better meet ergonomic requirements.

The hollow body 10 includes a first shell 11, a retaining member 12 and a second shell 13.

The first shell 11 has a first port 111, a second port 112 and a trough 114 formed on the top, and a first screw hole 113 in the interior.

The retaining member 12 is coupled to the interior of the first shell 11, and has a retaining trough 121, an opening 122 and a second screw hole 123. The opening 122 corresponds to the first port 111. The second screw hole 123 corresponds to the first screw hole 113 and may receive a fastening element 30 to run through the second screw hole 123 and the first screw hole 113 to couple the first shell 11 and the retaining member 12 together.

The second shell 13 is coupled with the first shell 11, and has a plurality of holding members 131. Each of the holding members 131 has an arched notch 1311 to function as a housing trough 1312 corresponding to the retaining trough 121. The housing trough 1312 and the retaining trough 121 jointly form a housing section 14 in the hollow body 10. The second shell 13 has a third screw hole 132 corresponding to the first screw hole 113 to receive a fastening element 30 to run through the third screw hole 132, the second screw hole 123 and the first screw hole 113 to couple the first shell 11, the retaining member 12 and the second shell 13 together. It is also possible to couple the second shell 13 only with the first shell 11 with the fastening element 30 running through the third screw hole 132 and the first screw hole 113 (not shown in the drawings).

The sliding cap 20 includes a cap body 21 and an axle 22. The cap body 21 matches the curvature of a normal human palm and has a boss 211, a button 212, an elastic anchor member 213 and a deck 214. The boss 211 runs through the first port 111, is pivotally coupled to the top of the hollow body 10, and has a coupling cavity 2111 and a fourth screw hole 2112 formed thereon. The coupling cavity 2111 is coupled with the axle 22. The fourth screw hole 2112 is located in the coupling cavity 2111. The button 212 corresponds to the second port 112. The elastic anchor member 213 has elasticity and corresponds to the trough 114. When the cap body 21 is slid to a desired operation position, the elastic anchor member 213 may be wedged in the trough 114 to anchor the cap body 21 on the first shell 11. The deck 214 is located below the button 212 and has a coupling strut 2141 to run through an aperture 42 of a circuit board 40 for mounting the circuit board 40 onto the deck 214, so that a switch 41 on the circuit board 40 may be depressed with the button 212. The second port 112 is formed to a size that allows the deck 214 to be moved relative to the hollow body 10 to a desired angle.

The axle 22 has a fifth screw hole 221 on one end corresponding to the fourth screw hole 2112 to receive a fastening element 30 to run through the fifth screw hole 221 and the fourth screw hole 2112 sequentially to couple the cap body 21 to the axle 22. Of course, the axle 22 has to pass through the opening 122. The axle 22 has the other end forming an axle ball 222, which is located in the housing section 14 and is surrounded to enable the cap 21 to turn about the axle 22.

For assembly of the invention, a fastening element 30 runs through the first screw hole 113 and the second screw hole 123 sequentially to couple the retaining member 12 with the first shell 11. The boss 211 runs through the first port 111. The retaining member 12 has one end running through the opening 122. The fastening element 30 runs through the fourth screw hole 2112 and the fifth screw hole 221 sequentially to couple the cap body 21 to the axle 22. Finally, another fastening element 30 runs through the first screw hole 113, second screw hole 123 and third screw hole 132 sequentially to couple the first shell 11, retaining member 12 and the second shell 13 together.

When the invention is in use, the sliding cap 20 may be slid on the top of the hollow body 10 until reaching a desired operation position. Then the elastic anchor member 213 is wedged in the trough 114 to anchor the position. Thus the sliding cap 20 may be fine-tuned on the hollow body 10 and anchored. When the invention is moved during operation, it can absorb the reaction force to avoid hurting the user's wrist and better meet ergonomic requirements.

Figure 4A:
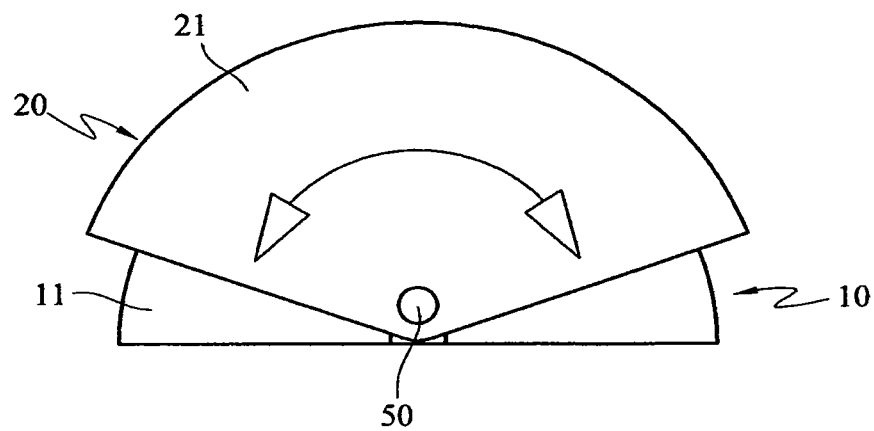
FIGS. 4A and 4B are schematic views of a first embodiment of the stub shaft location.
Figure 4B:
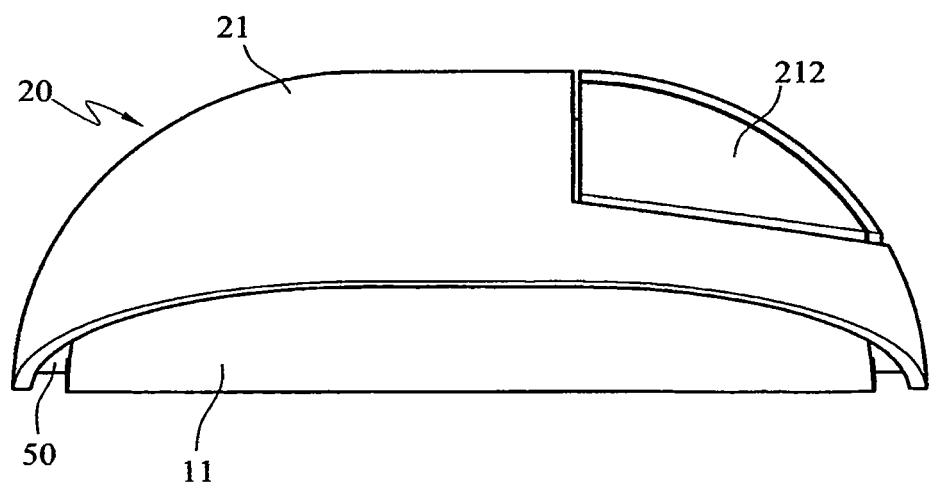
Figure 5A:
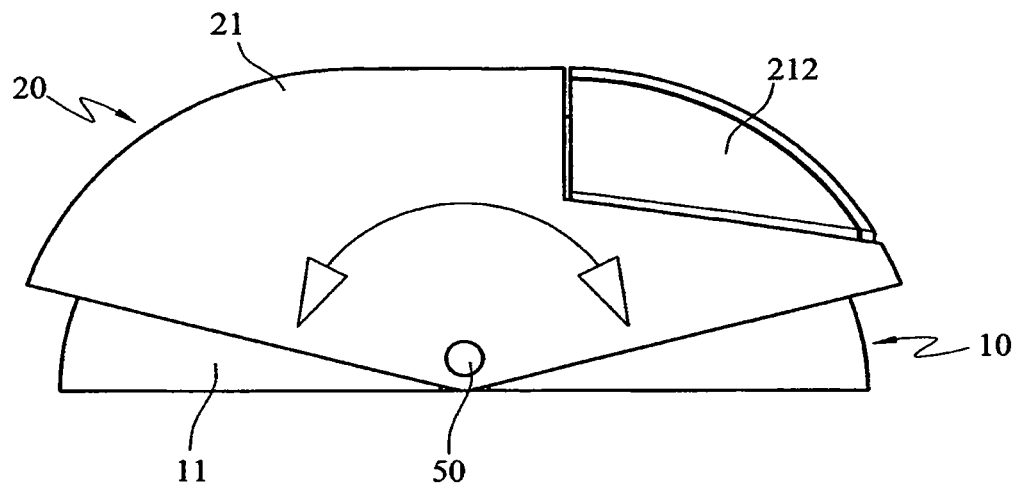
FIGS. 5A and 5B are schematic views of a second embodiment of the stub shaft location.
Figure 5B:
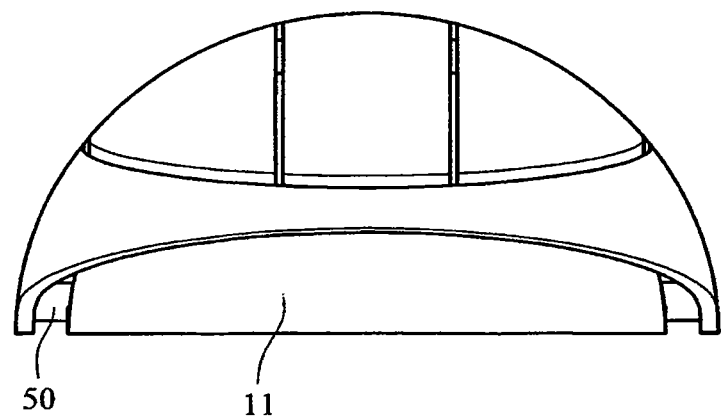

To make the sliding direction of the sliding cap 20 more accurate, stub shafts 50 may be provided on the top of the hollow body 10 and two opposite sides of the sliding cap 20. When sliding the sliding cap 20 to the leftwards and rightwards relative to the hollow body 10, the stub shafts 50 are pivotally located on the front and rear sides of the hollow body 10 and the sliding cap 20, as shown in a first embodiment in FIGS. 4A and 4B. The trough 114 and the elastic anchor member 213 are located on the front side and rear side of the hollow body 10 and the sliding cap 20 (not shown in the drawings). When sliding the sliding cap 20 forwards and backwards relative to the hollow body 10, the stub shafts 50 are pivotally located on the left and right sides of the hollow body 10 and the sliding cap 20, as shown in a second embodiment in FIGS. 5A and 5B. The trough 114 and the elastic anchor member 213 are located on the left side and right side of the hollow body 10 and the sliding cap 20 (not shown in the drawings).

Figure 6A:
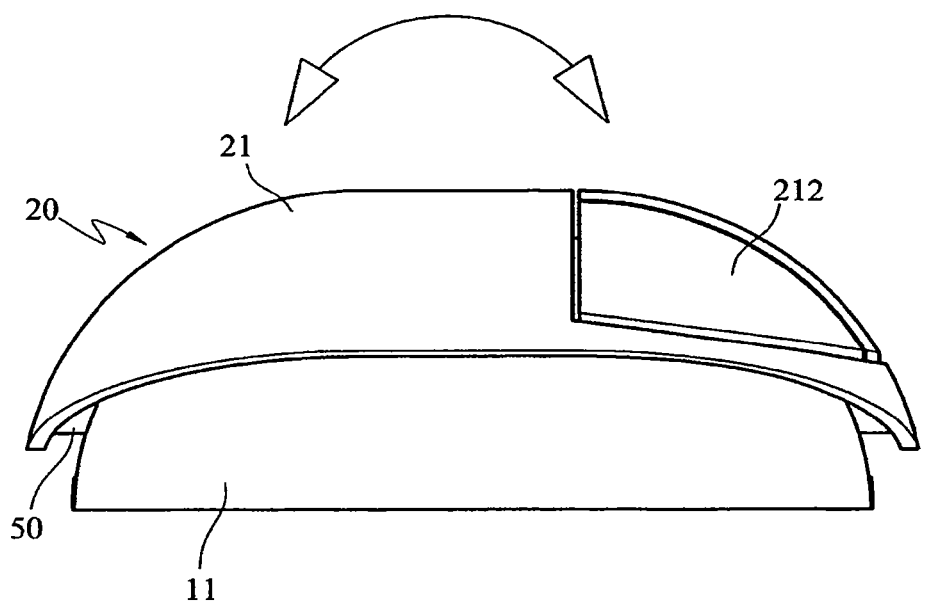
FIGS. 6A and 6B are schematic views of a third embodiment of the stub shaft location.
Figure 6B:
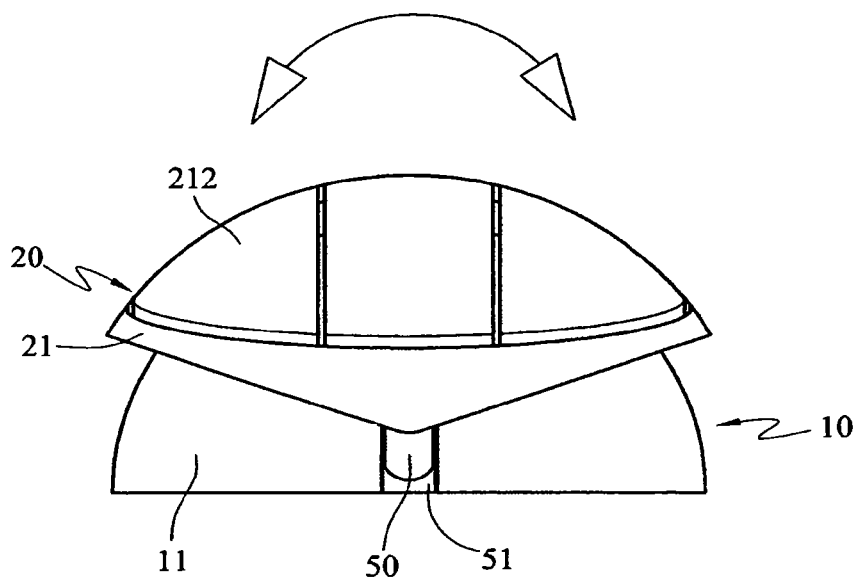
Figure 7A:
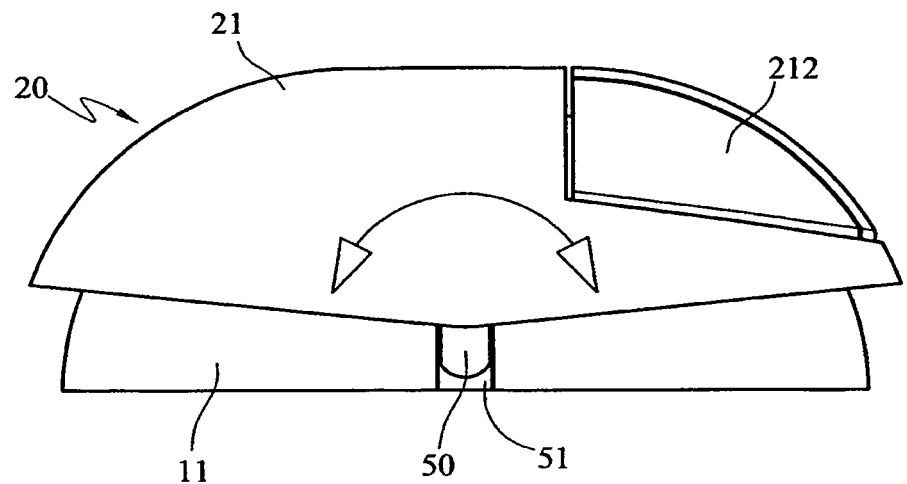
FIGS. 7A and 7B are schematic views of a fourth embodiment of the stub shaft location.
Figure 7B:
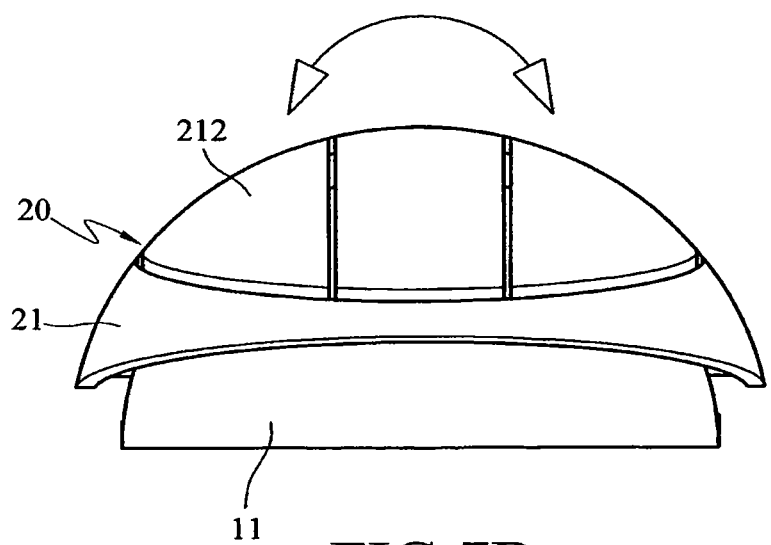

When sliding the sliding cap 20 forwards, backwards, to the leftwards and rightwards relative to the hollow body 10, the stub shafts 50 are pivotally located on the front and rear sides of the hollow body 10 and the sliding cap 20, so that the sliding cap 20 may be slid to the leftwards and rightwards, and the hollow body 10 further has a sliding track 51 on the top to allow the stub shafts 50 to move forwards and backwards, as shown in a third embodiment in FIGS. 6A and 6B. The trough 114 and the elastic anchor member 213 are located on the front side, rear side, left side and right side of the hollow body 10 and the sliding cap 20 (not shown in the drawings). On the other hand, when sliding the sliding cap 20 forwards, backwards, to the leftwards and rightwards relative to the hollow body 10, the stub shafts 50 are pivotally located on the left and right sides of the hollow body 10 and the sliding cap 20, so that the sliding cap 20 may be slid forwards and backwards, and the hollow body 10 further has a sliding track 51 on the top to allow the stub shafts 50 to move to the leftwards and rightwards, as shown in a fourth embodiment in FIGS. 7A and 7B. The trough 114 and the elastic anchor member 213 are located on the front side, rear side, left side and right side of the hollow body 10 and the sliding cap 20 (not shown in the drawings).

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A mouse comprising:
    a hollow body comprising a first shell portion having a first port extending therethrough and at least one depression formed therein; and
    a sliding cap carried by the first shell portion, wherein the sliding cap is configured to slidably move relative to the hollow body, and wherein the sliding cap comprises:
        a cap body having a boss extending through the first port;
        an axle operably coupled to the boss and having a first end at the cap body and a second end at an interior portion of the hollow body, wherein the cap body is configured to pivot relative to the hollow body via the axle; and
        an elastic anchor member between the sliding cap and the hollow body, wherein the elastic anchor member is positioned to directly engage the at least one depression to removably secure the cap body on the hollow body.

2. The mouse of claim 1 wherein the hollow body further comprises:
    a retaining member coupled to the interior of the first shell portion and having a retaining trough corresponding to the axle formed therein; and
    a second shell portion coupled to the first shell portion and having a housing trough corresponding to the retaining trough formed therein, wherein the housing trough and the retaining trough are configured to jointly receive the second end of the axle.

3. The mouse of claim 2 wherein the axle comprises an axle ball at the first end, and the axle ball is surrounded by the housing trough and the retaining trough, wherein the cap body and the axle are configured to turn with respect to the hollow body.

4. The mouse of claim 2, further comprising a fastening element that operably couples the retaining member to the first shell portion.

5. The mouse of claim 2, further comprising a fastening element, and wherein:
the first shell portion has a first threaded aperture formed therethrough;
the retaining member has a second threaded aperture corresponding to the first threaded aperture formed therethrough;
the second shell portion has a third threaded aperture corresponding to the first threaded aperture formed therethrough; and
the fastening element extends through the third threaded aperture, the second threaded aperture, and the first threaded aperture to operably couple the first shell portion, the retaining member, and the second shell portion.

6. The mouse of claim 1, wherein the cap body comprises a button, and the first shell portion has a second port corresponding to the button formed therethrough.

7. The mouse of claim 6 wherein:
the cap body further comprises a deck corresponding to the button;
the deck comprises a strut operably coupled to an aperture of a circuit board, wherein the strut is configured to hold the circuit board on the deck and to allow the button to depress a switch located on the circuit board; and
the second port is sized to allow the deck to be moved relative to the hollow body to a selected angle.

8. The mouse of claim 1 wherein the boss comprises a coupling cavity operably coupled to the first end of the axle, and wherein a fastening element operably couples the cap body to the axle.

9. The mouse of claim 1, further comprising two stub shafts pivotally coupling the hollow body and two opposite sides of the sliding cap.

10. The mouse of claim 9 wherein:
the two stub shafts are configured to pivotally couple an exterior of the hollow body with a first side and a second side of the sliding cap, wherein the first side is opposite the second side; and
the exterior of the hollow body has a sliding track formed therein, wherein the stub shafts are configured to move along the sliding track.

11. A mouse, comprising:
a first body comprising a first opening extending therethrough and a ball socket positioned in the first body;
a second body positioned around at least a portion of the first body, wherein the second body comprises a projection extending through the first opening, the projection having a first end operably coupled to the second body and a second end having a ball cooperatively received by the ball socket of the first body; and
an elastic member between the first body and the second body,
wherein the second body is configured to move relative to the first body via the ball socket and the ball to adjust an angular orientation of the second body with respect to the first body, and
wherein the elastic member is configured to directly engage a depression in the first body to removably anchor the second body at the desired angular orientation relative to the first body.

12. The mouse of claim 11 wherein:
the first body comprises a second opening extending through the first body; and
the second body comprises a button and a deck, wherein the deck is positioned in the second opening and carries a circuit board, and further wherein the circuit board includes at least one switch actuated by the button.

13. The mouse of claim 11, further comprising a pair of shafts positioned on opposite sides of the ball, wherein the shafts are aligned along a pivot axis that extends through a center of the ball.

14. The mouse of claim 13, further comprising a pair of grooves cooperatively receiving the pair of shafts, wherein the grooves are positioned to allow reorientation of the pivot axis as the second body moves relative to the first body.

15. A method of manufacturing a mouse, the method comprising:
attaching a first body to a base shell member, the first body comprising at least one depression formed therein, a first opening extending therethrough, and a ball socket positioned in the first body; and
positioning a second body in contact with an external surface of the first body, wherein the second body comprises—
a projection extending through the first opening, the projection having a distal end with a ball engaged with the ball socket to define, at least in part, a ball-and-socket joint, and wherein the second body is configured to pivotably move relative to the first body via the ball-and-socket joint disposed inside the first body; and
an anchoring member disposed between the first body and the second body and positioned to directly engage the at least one depression and removably secure the second body on the first body.

16. The method of claim 15 wherein positioning the second body excludes translating the second body in a direction along an axis extending through the center of the ball-and-socket joint.

17. The method of claim 15 wherein positioning the second body comprises positioning the second body over at least a portion of the external surface of the first body with the second body carried by and slidably movable relative to the first body.

18. The method of claim 15, further comprising a retaining member coupled to an interior portion of the first body, and wherein:
attaching a first body to a base shell member comprises operably coupling the retaining member to a trough portion on the base shell member, wherein the retaining member and the trough portion define, at least in part, the ball-and-socket joint.

19. The method of claim 15 wherein positioning a second body in contact with an external surface of the first body comprises positioning the second body such that the second body is slidably movable about the external surface of the first body to absorb at least a portion of the external reaction forces during operation.

20. A mouse comprising:
a first body comprising a first opening extending therethrough and a depression formed therein; and
a second body positioned around at least a portion of the first body and configured to slidably move relative to the first body, wherein the second body comprises a projection extending through the first opening and an elastic anchor member integral with and projecting away from the second body, wherein the elastic anchor member is positioned to directly engage the depression of the first body to removably secure the second body at a desired orientation relative to the first body.

21. The mouse of claim 20 wherein:

the first body comprises a plurality of depressions formed therein;

the second body comprises an outer surface shaped to match, at least in part, a curvature of a human palm, and an inner surface opposite the outer surface and facing the first body; and the elastic anchor member projects away from the inner surface of the second body toward the first body and is positioned to engage one of the plurality of depressions to removably secure the second body at the desired orientation relative to the first body.

\* \* \* \* \*